US008656032B2

(12) United States Patent
Ren et al.

(10) Patent No.: US 8,656,032 B2
(45) Date of Patent: Feb. 18, 2014

(54) METHOD AND SYSTEM FOR SUBSCRIPTION SERVICE IN IP MULTIMEDIA SUBSYSTEM NETWORK

(75) Inventors: Qin Ren, Shenzhen (CN); Chen Wu, Shenzhen (CN); Cuizhong Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/258,333

(22) PCT Filed: Jul. 7, 2010

(86) PCT No.: PCT/CN2010/075036
§ 371 (c)(1),
(2), (4) Date: Apr. 23, 2012

(87) PCT Pub. No.: WO2010/145623
PCT Pub. Date: Dec. 23, 2010

(65) Prior Publication Data
US 2012/0226812 A1    Sep. 6, 2012

(30) Foreign Application Priority Data
Oct. 29, 2009  (CN) .......................... 2009 1 0235910

(51) Int. Cl.
*G06F 15/16*    (2006.01)
(52) U.S. Cl.
USPC ........................................................ 709/228
(58) Field of Classification Search
USPC ................................................. 709/227, 228
See application file for complete search history.

(56) References Cited

U.S. PATENT DOCUMENTS

2008/0317011 A1* 12/2008 Datta et al. .................... 370/356

FOREIGN PATENT DOCUMENTS

| CN | 101159570 A | 4/2008 |
| CN | 101217480 A | 7/2008 |

OTHER PUBLICATIONS

International Search Report in international application No. PCT/CN2010/075036, mailed on Oct. 21, 2010.
English Translation of the Written Opinion of the International Search Authority in international application No. PCT/CN2010/075036, mailed on Oct. 21, 2010.

* cited by examiner

*Primary Examiner* — Frantz Jean
(74) *Attorney, Agent, or Firm* — Oppedahl Patent Law Firm LLC

(57) ABSTRACT

A method for subscription service in an IP multimedia subsystem is disclosed. A Session Border Controller (SBC) establishes IP channels between the SBC and an IMS terminal as well as between the SBC and a Resource List Server (RLS) after receiving a status subscribe request message from the IMS terminal; and the RLS sends the status information and an acknowledgment message to the IMS terminal through the IP channels after finding subscribed status information for the IMS terminal. A system for a subscription service in an IP multimedia subsystem network is further disclosed. The IP channels established in the present disclosure to transmit the subscription information on the RLS not only can transmit a great amount of information, but also has higher efficiency of information transmission, as long as the IMS terminal has a capability of processing IP data packets.

11 Claims, 5 Drawing Sheets

Prior Art

Prior Art

Prior Art

METHOD AND SYSTEM FOR SUBSCRIPTION SERVICE IN IP MULTIMEDIA SUBSYSTEM NETWORK

TECHNICAL FIELD

The present disclosure relates to a service subscription technology of an IMS terminal in an IP Multimedia Subsystem (IMS), and in particular to a service subscription technology with a large amount of transmission information and high transmission frequency in the IMS.

BACKGROUND

As an IP-based network architecture proposed by the 3rd Generation Partnership Project (3GPP), an IMS network constructs an open and flexible service environment, supports multimedia applications, and provides rich multimedia services for user terminals. The IMS is an IP-based telecommunication network architecture, which is independent of access technologies, and can provide services not only for packet access networks such as General Packet Radio Service (GPRS), Wireless Local Area Network (WLAN) and the like, but also for mobile cellular networks such as Global System for Mobile communications (GSM), Universal Mobile Telecommunications System (UMTS) and the like.

In the IMS, status presence is a service that notifies one user terminal of accessibility, availability and communication desire of another user terminal. The status presence service can show whether other user terminals are online, or, show status information of these user terminals when they are online, that is, show whether the user terminals are idle or busy (for example, they are in conference, on the phone or the like). Besides, the status presence service can enable the user terminals to provide detailed information of communication modes and communication capabilities, for example, the status can present whether the user terminals have such capabilities as audio, video, instant message and the like. The implementation of this service is generally realized through release, subscription and notification of status presence information.

In a typical IMS network, based on features of the presence service, the realization of the presence service among user terminals puts forward higher requirements on transmission capacity of a great deal of information, high frequency, and strong burst processing capability of the whole network device in the IMS network than realization of other services. In order to guarantee smooth presence service, the processing capability of each relevant device has to be improved on one hand, and the processing flow of the service has to be simplified on software on the other hand.

FIG. 1 shows a schematic diagram of a reference frame of an IMS presence service, as shown in FIG. 1, an IMS terminal plays two roles of an observer and a Presence User Agent (PUA); a Presence Agent (PA) is an Application Server (AS) located in a home network. A Resource List Server (RLS) is also suitable for realizing functions of an application server, and an AS providing other services can serve as the observer of a Presence Entity (PE). Most of interfaces interacted among devices realize the function of status presence of Session Initialization Protocol (SIP) interfaces or Diameter interfaces of an IMS. For a Pen interface, it allows an application server to act as a PUA to release status presence information to a PA of a PE. The PUA can obtain status information of a user terminal from any possible information sources, such as Home Location Register (HLR) in the a circuit switching network, Service GPRS Support Node (SGSN) in a GPRS network, or Service-Call Session Control Function (S-CSCF) registered by the IMS.

FIG. 2 shows a flow chart of an IMS terminal subscribing a status information list in an RLS, as shown in FIG. 2, the flow of realizing status presence in an IMS network comprises the following steps:

step 201: an observer application program in the IMS terminal sends a Subscribe request to the status presence list of the observer application program, the Event header field of the request is set as Eventlist to indicate that the request is sent to a list rather than a single PE;

step 202-step 203: the Subscribe request is forwarded to an Interrogating-Call Session Control Function (I-CSCF) via a Session Border Controller (SBC) and then forwarded to an S-CSCF, at this moment, an initial filtering rule is triggered;

step 204: the filtered rule is forwarded to a related application server functioned as the RLS;

step 205-step 208: after verifying the identity of the requestor and authorizing the subscription, the RLS sends a response 200OK and forwards it to the IMS terminal via the S-CSCF, a P-CSCF and the SBC;

step 209-step 212: the RLS sends a NOTIFY request, although the NOTIFY request contains no status presence information and needs to be forwarded to the IMS terminal via the S-CSCF and the P-CSCF;

step 213-step 216: the IMS terminal responds with 200OK and forwards it to the RLS via the S-CSCF, the P-CSCF and the SBC; and step 217-step 220: the RLS subscribes information of all PEs one by one jn a resource list; when collecting enough information, the RLS generates another NOTIFY request and forwards it to the IMS terminal via the S-CSCF, the P-CSCF and the SBC. The NOTIFY request contains all presence information received from the PUAs of the PEs.

It can be seen from the flow chart shown in FIG. 2 that, whenever one IMS terminal observer wants to subscribe status presence information of a PE, the IMS terminal observer needs to adopt a Subscribe command and a NOTIFY command to interact with the RLS; even in the case of least interaction, both the IMS terminal observer and the RLS need to perform interaction using SIP commands for six times.

FIG. 3 shows a flow chart that the RLS subscribes information of one PE in the resource list, as shown in FIG. 3, the specific steps are as follows:

step 301-step 306: the RLS sends a Subscribe request, whose Event header field is set as Presence, to one PE in the resource list, an S-CSCF in an RLS home network forwards the Subscribe request to an I-CSCF in a network where the PE is located, and the I-CSCF searches HSS through a Diameter interface to obtain the S-CSCF where the PE is located, and forwards the Subscribe request to a PA;

step 307-step 310: the PA responds with 200OK and forwards it to the RLS via the I-CSCF;

step 311: the PA sends a NOTIFY message containing status presence information of the PE, and directly forwards it to the S-CSCF in the RLS network;

step 312: the S-CSCF in the RLS network forwards the NOTIFY message coming from the PA to the RLS; and step 313-step 314: the RLS responds with 200OK and forwards it to the PA via the S-CSCF.

It can be seen from the processing flows shown in FIG. 2 and FIG. 3 that, if one IMS terminal wants to realize a subscription to one PE, in the visited network and home network of the initiator, the IMS terminal and the RLS need to perform interaction with at least six SIP signalings, devices between the IMS terminal and the RLS also need to process at least twelve signalings. The RLS in a core network also needs four signalings to perform interaction. The presence service allows one user terminal to subscribe information of multiple PEs and allows multiple user terminals to subscribe crisscross, thus the PEs change frequently, this may cause NOTIFY information explosion and highly frequent generation of a great deal of information. Therefore, the application servers and the network devices in the IMS will be impacted significantly and normal allocation of call resources and occupation of capacity resources will be influenced.

SUMMARY

In view of the above-mentioned problem, the main purpose of the present disclosure is to provide a method and a system for a subscription service in an IP multimedia subsystem network, so that IP channels can be established between an IMS terminal and an SBC as well as between the SBC and an RLS, and after the RLS finds corresponding subscription information, the corresponding subscription information can be forwarded to the IMS terminal from the SBC through the above-mentioned IP channel.

In order to achieve the above-mentioned purpose, the technical solution of the present disclosure is realized as follows.

A method for a subscription service in an IP multimedia subsystem network includes:

a Session Border Controller (SBC) establishes IP channels between the SBC and an IMS terminal as well as between the SBC and a Resource List Server (RLS) after receiving a status subscribe request message from the IMS terminal; and after the RLS finds subscribed status information for the IMS terminal, the RLS sends the status information and an acknowledgment message to the IMS terminal through the IP channels.

Preferably, the status subscribe request message sent by the IMS terminal may contain information about whether the IMS terminal has a capability of receiving status subscription information through the IP channels.

Preferably, the step of establishing the IP channels may include:

when determining that the IMS terminal has the capability of receiving status subscription information through the IP channels according to the status subscribe request message received from the IMS terminal, the SBC determines an IP channel for the IMS terminal in the SBC, and sends the status subscribe request message to the RLS through an IP channel interface facing the RLS;

after receiving the acknowledgment message of the subscribe request message returned by the RLS, the SBC obtains an IP address of the RLS in the acknowledgment message, generates an IP forwarding strategy facing the RLS, establishes the IP channel between the SBC and the RLS, and sends the acknowledgment message of the subscribe request message to the IMS terminal; and after receiving the acknowledgment message from the SBC, the IMS terminal directly sends an empty data packet to an IP channel interface of the SBC facing the IMS terminal, and the SBC sets a forwarding strategy facing the IMS terminal after receiving the empty data packet and establishes the IP channel between the SBC and the IMS terminal.

Preferably, the step of sending the status subscribe request message to the RLS through the IP channel interface facing the RLS may include:

the status subscribe request message received from the IMS terminal is parsed, the information about whether the IMS terminal has the capability of receiving status subscription information through the IP channels is removed, address information of the IMS terminal in the status subscribe request message is replaced with an address of the IP channel interface facing the RLS, and then the address of the IP channel interface facing the RLS is sent to the RLS by a Proxy Call Session Control Function (P-CSCF) and a Service Call Session Control Function (S-CSCF).

Preferably, the SBC may obtain IP address information of the RLS contained in the acknowledgment message returned by the RLS, and use the IP address of the RLS as a destination address of data packets sent to the RLS from the IMS terminal; and the step of setting the IP forwarding strategy facing the IMS terminal may include:

the SBC obtains IP address information of the IMS terminal according to the empty data packet, and uses the IP address of the IMS terminal as a destination address of data packets sent to the IMS terminal from the RLS.

Preferably, after the IP channels are established between the SBC and the IMS terminal as well as between the SBC and the RLS, information may be not forwarded through the P-CSCF and the S-CSCF in the IP channels facing the RLS anymore.

A system for a subscription service in an IP multimedia subsystem network includes:

a receiving unit, located in an SBC and used configured to receive a status subscribe request message from an IMS terminal;

an establishing unit, configured to establish IP channels between the SBC and the IMS terminal as well as between the SBC and an RLS after the receiving unit receives the status subscribe request message from the IMS terminal;

a searching unit, located in the RLS and configured to find subscribed status information after receiving a subscribe request; and a sending unit, located in the RLS and configured to send the status information found by the searching unit and an acknowledgment message of the subscribe message to the IMS terminal through the IP channels established by the establishing unit.

Preferably, the status subscribe request message sent by the IMS terminal may contain information about whether the IMS terminal has a capability of receiving status subscription information through the IP channels.

Preferably, the establishing unit may further include:

a first determining subunit, located in the SBC and configured to determine whether the IMS terminal has the capability of receiving status subscription information through the IP channels according to the status subscribe request message received by the receiving unit from the IMS terminal, and to trigger the second determining subunit when the IMS terminal has the capability of receiving status subscription information through the IP channels;

a second determining subunit, located in the SBC and configured to determine an IP channel for the IMS terminal in the SBC;

a first sending subunit, located in the SBC and configured to send the status subscribe request message to the RLS through an IP channel interface facing the RLS;

a first receiving subunit, located in the SBC and configured to receive the acknowledgment message of the subscribe request message returned by the RLS;

an obtaining subunit, located in the SBC and configured to obtain an IP address of the RLS in the acknowledgment message after the first receiving subunit receives the acknowledgment message of the subscribe request message;

a first generating subunit, located in the SBC and configured to generate an IP forwarding strategy facing the RLS;

a first establishing subunit, located in the SBC and configured to establish the IP channel between the SBC and the RLS;

a second sending subunit, located in the SBC and configured to send the acknowledgment message of the subscribe request message to the IMS terminal;

a second receiving subunit, located in the IMS terminal and configured to receive the acknowledgment message of the subscribe message from the SBC;

a third sending subunit, located in the IMS terminal and configured to send an empty data packet to the SBC through an IP channel interface of the SBC facing the IMS terminal;

a third receiving subunit, located in the SBC and configured to receive the empty data packet;

a second generating subunit, configured to generate a forwarding strategy facing the IMS terminal; and a second establishing subunit, configured to establish the IP channel between the SBC and the IMS terminal.

Preferably, the first sending subunit may further include:

a parsing sub-module, configured to parse the status subscribe request message received from the IMS terminal;

a removing sub-module, configured to remove the information about whether the IMS terminal has the capability of receiving status subscription information through the IP channels;

a replacing sub-module, configured to replace address information of the IMS terminal in the status subscribe request message with an address of the IP channel interface facing the RLS; and a sending sub-module, configured to send the status subscribe request message to the RLS through a P-CSCF and an S-CSCF.

Preferably, the first generating subunit generates the IP forwarding strategy facing the RLS, including: obtaining through the obtaining unit the IP address information of the RLS contained in the acknowledgment message returned by the RLS, and using the IP address of the RLS as a destination address of data packets sent to the RLS from the IMS terminal; and the second generating subunit generates the IP forwarding strategy facing the IMS terminal, including: obtaining IP address information of the IMS terminal according to the empty data packet, and using the IP address of the IMS terminal as a destination address of data packets sent to the IMS terminal from the RLS.

In the present disclosure, after receiving a status subscribe request message from an IMS terminal, an SBC determines whether the IMS terminal has a capability of receiving status subscription information through IP channels according to the status subscribe request message, when determining that the IMS terminal has the capability of receiving status subscription information through the IP channels, the SBC then establishes an IP channel facing an RLS and an IP channel facing the IMS terminal; after the IP channels are established, the RLS sends the found subscription information requested by the IMS terminal to the IMS terminal through the above-mentioned IP channels. The IP channels established in the present disclosure which are applied to transmit the subscription information in the RLS not only can transmit a great amount of information, but also has higher efficiency of information transmission, as long as the IMS terminal has a capability of processing IP data packets.

DETAILED DESCRIPTION

The basic idea of the present disclosure is that: after receiving a status subscribe request message from an IMS terminal, an SBC determines whether the IMS terminal has a capability of receiving status subscription information through IP channels according to the status subscribe request message; when determining that the IMS terminal has the capability, the SBC then establishes an IP channel facing an RLS and an IP channel facing the IMS terminal; after the IP channels are established, the RLS sends found subscription information requested by the IMS terminal to the IMS terminal through the above-mentioned IP channels. The IP channels established in the present disclosure to transmit subscription information in the RLS not only can transmit a great amount of information, but also has higher efficiency of transmitting information, as long as the IMS terminal has the capability of processing IP data packets.

In order to make the purpose, technical solution and advantages of the present disclosure more clear, the present disclosure will be further described in details in conjunction with embodiments and the drawings.

In the present disclosure, by resetting the format of a status subscribe request (Subscribe) message sent to the SBC from the IMS terminal, a new information item is added in the Subscribe message to indicate whether the IMS terminal sending the Subscribe message has a capability of receiving status subscription information through the IP channels, in order to notify the SBC to determine whether to establish IP channels between the RLS and the SBC as well as between the SBC and the IMS terminal to bear subscription information with a great amount of data between the RLS and the IMS terminal, particularly after the RLS determines subscription information subscribed by the IMS terminal for the IMS terminal; the subscription information generally has a great amount of data, if the existing processing methods are adopted, the subscription information will be forwarded to the SBC through an S-CSCF, an I-CSCF, a P-CSCF and the like step by step, and then the SBC will forward the subscription information to the IMS terminal through corresponding network elements between the SBC and the IMS terminal. Since many network elements are involved during the forwarding of the information, the network elements directly communicating with each other need to confirm through corresponding acknowledgment messages whether the messages sent by themselves are sent successfully, thereby causing the network elements to bear less effective subscription information; furthermore, since the transmission formats of messages among the network elements are definite, effective information borne by the messages is relatively less, thereby resulting in lower efficiency of transmitting the whole subscription information.

Figure 1:
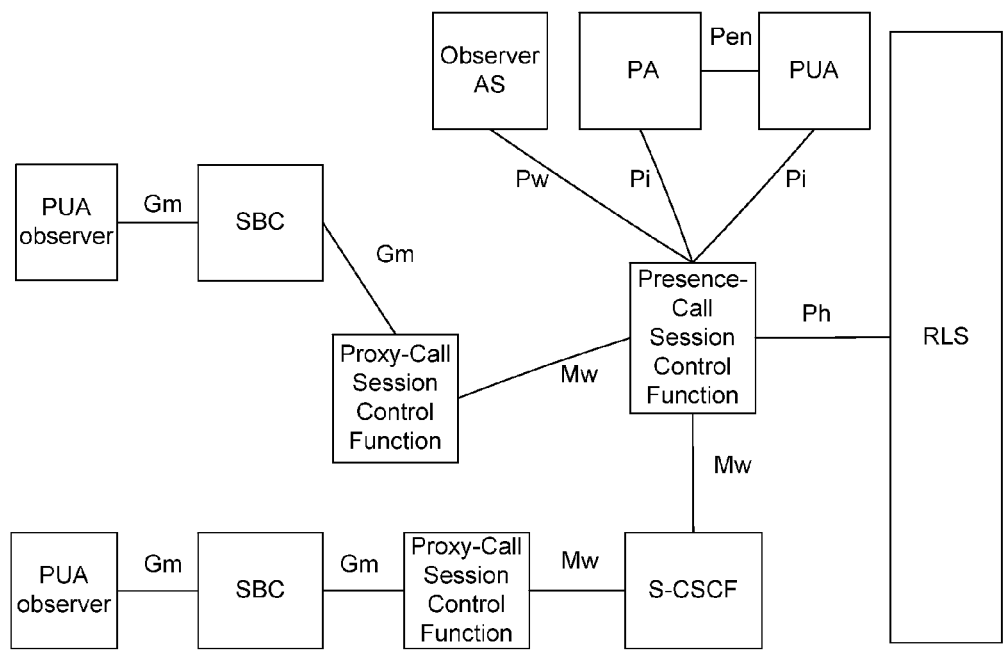
FIG. 1 shows a schematic diagram of a reference frame of an IMS presence service.
Figure 2:
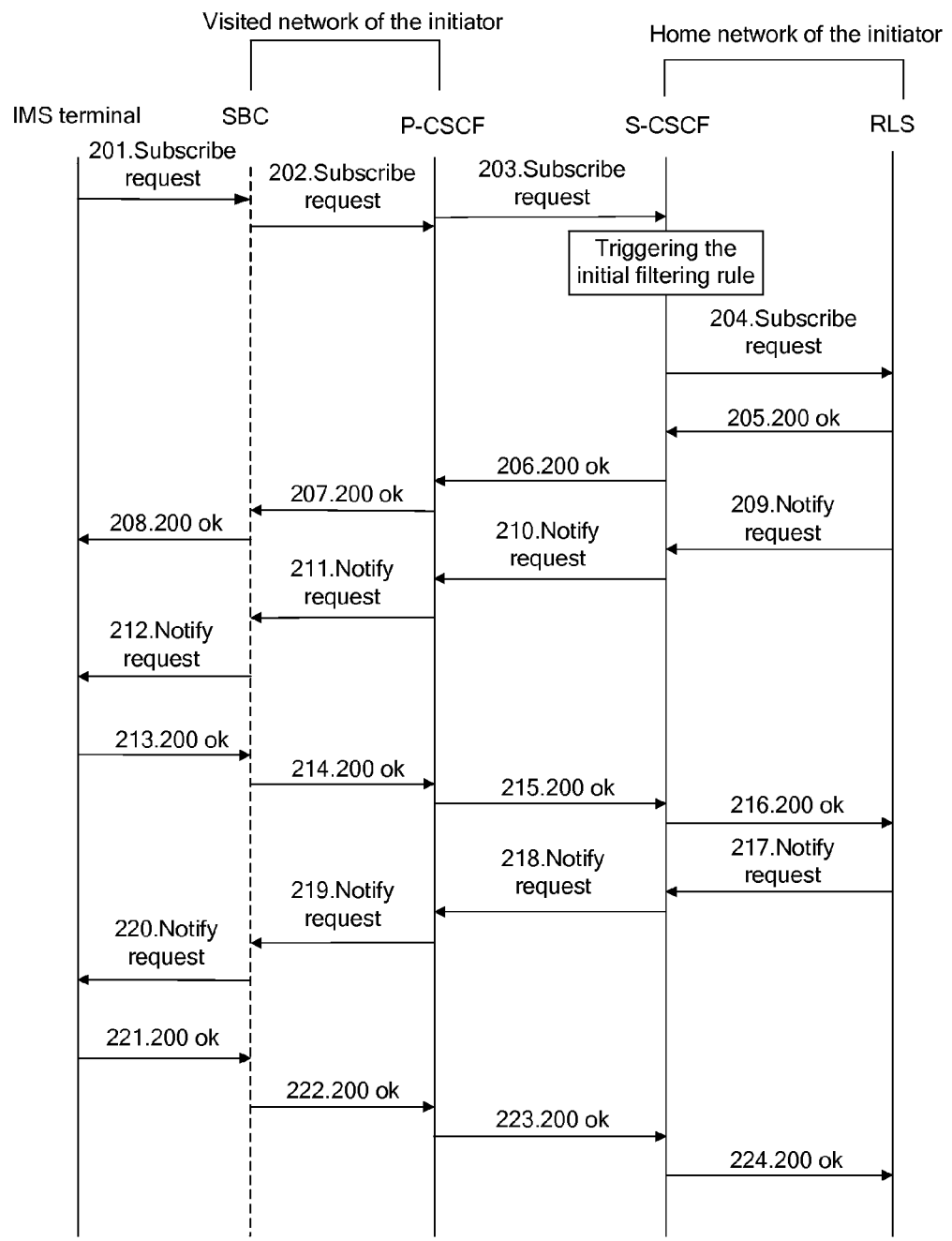
FIG. 2 shows a flow chart of subscribing a status information list in an RLS by an IMS terminal.
Figure 3:
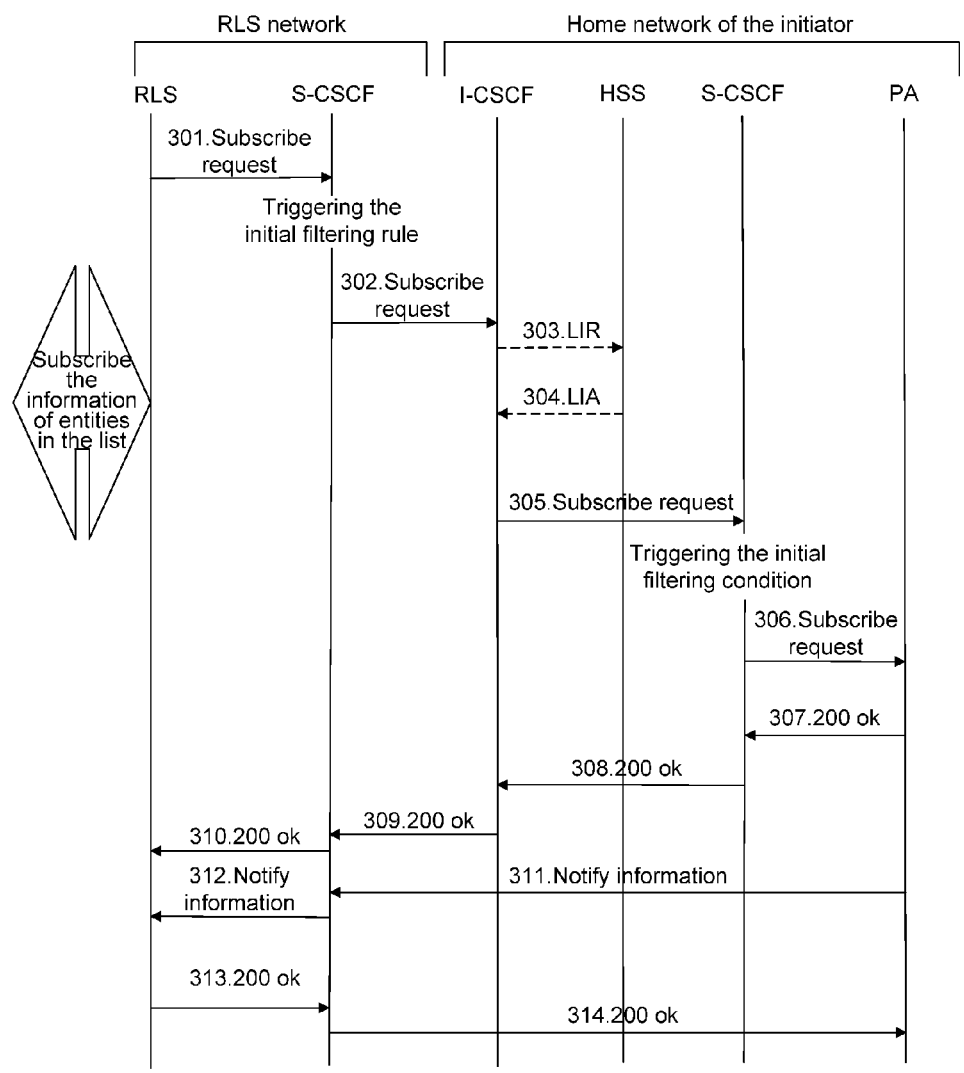
FIG. 3 shows a flow chart that the RLS subscribes information of one PE in a resource list.
Figure 4:
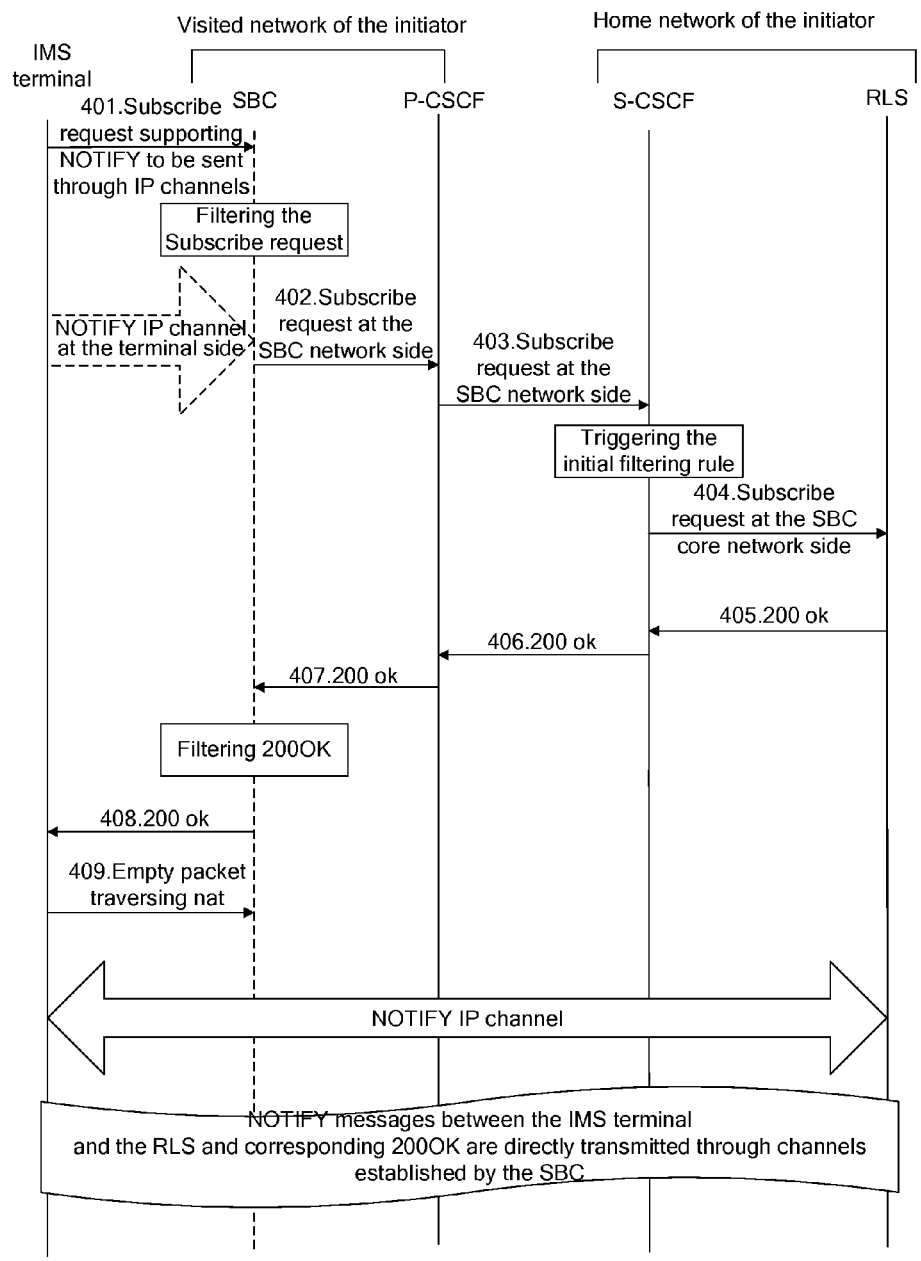
FIG. 4 shows a flow chart of a method for a subscription service in an IP multimedia subsystem network according to the present disclosure.

FIG. 4 shows a flow chart of a method for a subscription service in an IP multimedia subsystem network according to the present disclosure, as shown in FIG. 4, the method for a subscription service in an IP multimedia subsystem network according to the present disclosure specifically comprises the following steps.

step 401: an IMS terminal initializes a Subscribe request to a status presence list of the IMS terminal, and the Subscribe request describes that the IMS terminal has a function of receiving a presence service through IP channels, that is, Subscribe request contains information about whether the IMS terminal has a capacity of receiving status subscription information through IP channels;

step 402: an SBC filters the Subscribe request received from the IMS terminal, judges whether NOTIFY is supported to be sent through the IP channels in the Subscribe request, if the NOTIFY is supported to be sent through the IP channels, then an IP channel in the SBC is allocated for this subscription, and the Subscribe request is sent to a P-CSCF after an extended field (the filed indicating whether the IMS terminal has a capability of receiving status subscription information through IP channels) in the Subscribe request is removed; before sending the Subscribe request message, the SBC uses an IP channel interface allocated for a core network as identity information of the IMS user terminal in the Subscribe to replace the IMS terminal to make the subscribe request;

step 403: the P-CSCF forwards the Subscribe request initialized by the SBC to an S-CSCF, and triggers an initial filtering rule; the initial filtering rule has the same processing way as the initial filtering rule in the step 203 shown in FIG. 2, the specific processing way of the initial filtering rule in the step 403 can be understood with reference to the specific provisions of the protocol, which will not be described in detail here;

step 404: the S-CSCF forwards the filtered Subscribe request to an RLS application server related to the initial filtering rule;

step 405: the RLS responds with 200OK and forwards it to the S-CSCF;

step 406: the S-CSCF forwards the 200OK sent by the RLS to the P-CSCF;

step 407: the P-CSCF forwards the 200OK sent by the RLS to the SBC;

step 408: after receiving the 200OK sent by the RLS, the SBC filters the forwarding addresses; for the presence service, the RLS uses the address of the IP channel from the SBC to the RLS as the communication destination address of the NOTIFY service. The SBC generates a forwarding strategy locally, and uses the IP address of the RLS as the destination address of information sent to the IMS terminal from the SBC, such that the IP channel between the SBC and the RLS is perfected, and the 200OK abstracted by the user terminal side of the IP channel is forwarded to the IMS terminal. Here, the SBC obtains IP address information of the RLS through the 200OK returned by the RLS, and uses the RLS address as the destination address of data packets sent to the RLS from the IMS terminal. It should be understood by those skilled in the art that, it is easy for the SBC to generate an IP forwarding strategy facing the RLS according to the IP address information of the RLS; and step 409: after receiving the 200OK acknowledgment message from the SBC, the IMS terminal directly communicates with an IP channel port of the SBC facing the IMS terminal, and sends an empty data packet to the port facing the IMS terminal to open up the IP channel between the IMS terminal and the SBC; after receiving the empty data packet, the SBC obtains forwarding addresses involved in forwarding the data packet, and generates a strategy of address forwarding between the IMS terminal and the SBC, thereby perfecting the IP channel between the IMS terminal and the SBC, such that IP channels are established between the IMS terminal and the SBC as well as between the SBC and the RLS.

At the moment, the IP channels have been established, NOTIFY information collected by the RLS is directly sent to the SBC through the IP channel between the RLS and the SBC, and then the SBC communicates with the IMS terminal through the IP channel between the SBC and the IMS terminal, and forwards the NOTIFY information to the IMS terminal through the above-mentioned two IP channels.

In the present disclosure, during the process of initiating a subscription by the IMS terminal, the SBC ends the subscribe request received from the IMS terminal, the SBC in the IMS network replaces the IMS terminal to carry out the subscription, IP channels are is established between the IMS terminal and the SBC as well as between the SBC and the RLS, such that NOTIFY messages with a great amount of information, strong burstiness and high message frequency are transferred in the IP channels, and not forwarded through P-CSCF and S-CSCF anymore. The NOTIFY messages collected by the RLS are directly transmitted to the SBC through the IP channels, and the SBC directly forwards the NOTIFY messages to the IMS terminal through the IP channels, in this way, the impact of the NOTIFY messages on a core network device can be inhibited effectively, the occupation of traditional subscription services on call data area of the call core network device can be decreased, and the capacity of the core network device for supporting the service and the processing speed of the core network device can be effectively improved.

Figure 5:
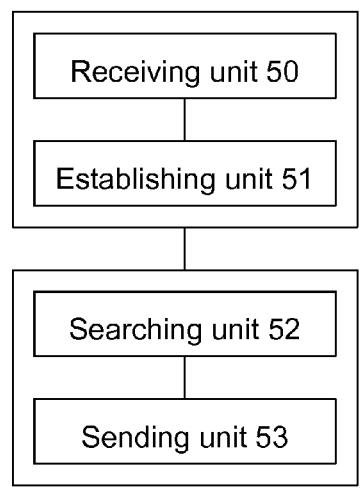
FIG. 5 shows a schematic diagram of composition and structure of a system for a subscription service in an IP multimedia subsystem network according to the present disclosure.

FIG. 5 shows a schematic diagram of composition and structure of a system for a subscription service in an IP multimedia subsystem network according to the present disclosure, as shown in FIG. 5, the system for a subscription service in an IP multimedia subsystem network in the present disclosure comprises a receiving unit 50, an establishing unit 51, a searching unit 52 and a sending unit 53, wherein the receiving unit 50 is located in an SBC and configured to receive a status subscribe request message from an IMS terminal; the establishing unit 51 is configured to establish IP channels between the SBC and the IMS terminal as well as between the SBC and an RLS after the receiving unit 50 receives the status subscribe request message from the IMS terminal; the searching unit 52 is located in the RLS and configured to find subscribed status information after receiving the subscribe request; and the sending unit 53 is located in the RLS and configured to send the status information found by the searching unit 52 and an acknowledgment message of the subscription message to the IMS terminal through the IP channels established by the establishing unit 51. Wherein the status subscribe request message sent by the IMS terminal contains information about whether the IMS terminal has a capability of receiving status subscription information through IP channels.

Figure 6:
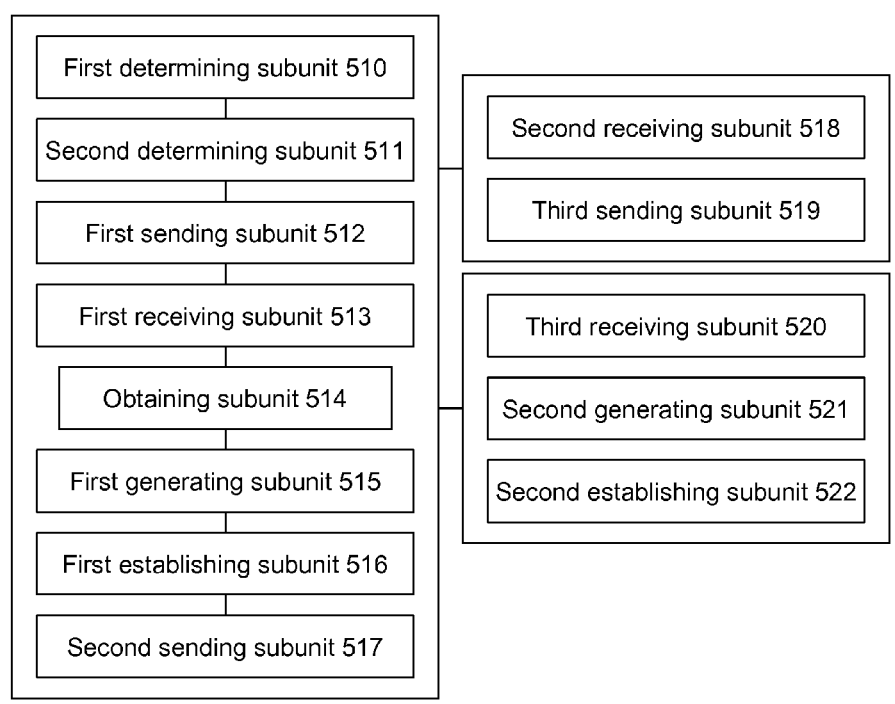
FIG. 6 shows a schematic diagram of composition and structure of an establishing unit according to the present disclosure.

FIG. 6 shows a schematic diagram of composition and structure of the establishing unit according to the present disclosure, as shown in FIG. 6, the establishing unit 51 in the present disclosure comprises a first determining subunit 510, a second determining subunit 511, a first sending subunit 512, a first receiving subunit 513, an obtaining subunit 514, a first generating subunit 515, a first establishing subunit 516, a second sending subunit 517, a second receiving subunit 518, a third sending subunit 519, a third receiving subunit 520, a second generating subunit 521 and a second establishing subunit 522; wherein the first determining subunit 510 is located in the SBC and configured to determine whether the IMS terminal has a capability of receiving status subscription information through IP channels according to the status subscribe request message received by the receiving unit from the IMS terminal, and to trigger the second determining subunit 511 when the IMS terminal has the capability; the second determining subunit 511 is located in the SBC and configured to determine an IP channel for the IMS terminal in the SBC; the first sending subunit 512 is located in the SBC and configured to send the status subscribe request message to the RLS through an IP channel interface facing the RLS; the first receiving subunit 513 is located in the SBC and configured to receive the acknowledgment message of the subscribe request message returned by the RLS; the obtaining subunit 514 is located in the SBC and configured to obtain the IP address of the RLS in the acknowledgment message after the first receiving subunit 513 receives the acknowledgment message of the subscribe request message; the first generating subunit 515 is located in the SBC and configured to generate an IP forwarding strategy facing the RLS; the first establishing subunit 516 is located in the SBC and configured to establish an IP channel between the SBC and the RLS; the second sending subunit 517 is located in the SBC and configured to send the acknowledgment message of the subscribe request message to the IMS terminal; the second receiving subunit 518 is located in the IMS terminal and configured to receive the acknowledgment message of the subscribe message from the SBC; the third sending subunit 519 is located in the IMS terminal and configured to send an empty data packet to the SBC through an IP channel interface of the SBC facing the IMS terminal; the third receiving subunit 520 is located in the SBC and configured to receive the empty data packet; the second generating subunit 521 is configured to generate a forwarding strategy facing the IMS terminal; and the second establishing subunit 522 is configured to establish the IP channel between the SBC and the IMS terminal. Wherein the first sending subunit 512 comprises a parsing sub-module, a removing sub-module, a replacing sub-module and a sending sub-module; wherein the parsing sub-module is configured to parse the status subscribe request message received from the IMS terminal; the removing sub-module is configured to remove the information about whether the IMS terminal has the capability of receiving status subscription information through the IP channels from the status subscribe request message; the replacing sub-module is configured to replace address information of the IMS terminal in the status subscribe request message with the address of the IP channel interface facing the RLS; and the sending sub-module is configured to send the status subscribe request message to the RLS through a P-CSCF and an S-CSCF. Wherein the step that the first generating subunit 516 generates the IP forwarding strategy facing the RLS comprises: obtaining through the obtaining unit the IP address information of the RLS contained in the acknowledgment message returned by the RLS, and using the IP address of the RLS as the destination address of data packets sent to the RLS from the IMS terminal. The step that the second generating subunit 521 generates the IP forwarding strategy facing the IMS terminal comprises: obtaining IP address information of the IMS terminal according to the empty data packet, and using the IP address of the IMS terminal as the destination address of data packets sent to the IMS terminal from the RLS.

It should be understood by those skilled in the art that, the system for a subscription service in an IP multimedia subsystem network shown in FIG. 5 is designed to realize the foregoing method for a subscription service in the IP multimedia subsystem network, functions of all processing units in the system shown in FIG. 5 can be understood with reference to related descriptions in the foregoing method for a subscription service in the IP multimedia subsystem network, and functions of all processing units, subunits and sub-modules can be realized either by programs operated in a processor or through corresponding logic circuits.

The above are only preferred embodiments of the present disclosure and are not intended to limit the protection scope of the present disclosure.

The invention claimed is:

1. A method for a subscription service in an IP multimedia subsystem network, comprising:
    establishing IP channels between a Session Border Controller (SBC) and an IP Multimedia Subsystem (IMS) terminal as well as between the SBC and a Resource List Server (RLS) after the SBC receives a status subscribe request message from the IMS terminal; and
    sending, by the RLS, subscribed status information and an acknowledgment message to the IMS terminal through the IP channels after the RLS finds the subscribed status information for the IMS terminal.

2. The method according to claim 1, wherein the status subscribe request message sent by the IMS terminal contains information about whether the IMS terminal has a capability of receiving status subscription information through the IP channels.

3. The method according to claim 2, wherein the establishing the IP channels comprises:
    when determining that the IMS terminal has the capability of receiving status subscription information through the IP channels according to the status subscribe request message received from the IMS terminal, determining, by the SBC, an IP channel for the IMS terminal in the SBC, and sending by the SBC the status subscribe request message to the RLS through an IP channel interface facing the RLS;
    after receiving the acknowledgment message of the subscribe request message returned by the RLS, obtaining, by the SBC, an IP address of the RLS in the acknowledgment message, generating by the SBC an IP forwarding strategy facing the RLS, establishing by the SBC the IP channel between the SBC and the RLS, and sending by the SBC the acknowledgment message of the subscribe request message to the IMS terminal; and
    directly sending, by the IMS terminal, an empty data packet to an IP channel interface of the SBC facing the IMS terminal after the IMS terminal receives the acknowledgment message from the SBC, and setting, by the SBC, a forwarding strategy facing the IMS terminal after the SBC receives the empty data packet and establishing by the SBC the IP channel between the SBC and the IMS terminal.

4. The method according to claim 3, wherein the sending the status subscribe request message to the RLS through the IP channel interface facing the RLS comprises:
    parsing the status subscribe request message received from the IMS terminal, removing the information about whether the IMS terminal has the capability of receiving status subscription information through IP channels, replacing address information of the IMS terminal in the status subscribe request message with an address of the IP channel interface facing the RLS, and then sending the address of the IP channel interface facing the RLS to the RLS by a Proxy Call Session Control Function (P-CSCF) and a Service Call Session Control Function (S-CSCF).

5. The method according to claim 3, wherein the setting the IP forwarding strategy facing the RLS comprises:

obtaining, by the SBC, IP address information of the RLS contained in the acknowledgment message returned by the RLS, and using, by the SBC, the IP address of the RLS as a destination address of data packets sent to the RLS from the IMS terminal; and the setting the IP forwarding strategy facing the IMS terminal comprises:

obtaining, by the SBC, IP address information of the IMS terminal according to the empty data packet, and using, by the SBC, the IP address of the IMS terminal as a destination address of data packets sent to the IMS terminal from the RLS.

6. The method according to claim 3, wherein, after the IP channels are established between the SBC and the IMS terminal as well as between the SBC and the RLS, information is not forwarded through a P-CSCF and an S-CSCF in the IP channels facing the RLS anymore.

7. A system for a subscription service in an IP multimedia subsystem (IMS) network, comprising a receiving unit, an establishing unit, a searching unit and a sending unit; wherein the receiving unit is located in an SBC and configured to receive a status subscribe request message from an IMS terminal;

the establishing unit is configured to establish IP channels between the SBC and the IMS terminal as well as between the SBC and an RLS after the receiving unit receives the status subscribe request message from the IMS terminal;

the searching unit is located in the RLS and configured to find subscribed status information after receiving a subscribe request; and the sending unit is located in the RLS and configured to send the status information found by the searching unit and an acknowledgment message of the subscribe message to the IMS terminal through the IP channels established by the establishing unit.

8. The system according to claim 7, wherein the status subscribe request message sent by the IMS terminal contains information about whether the IMS terminal has a capability of receiving status subscription information through the IP channels.

9. The system according to claim 8, wherein the establishing unit further comprises a first determining subunit, a second determining subunit, a first sending subunit, a first receiving subunit, an obtaining subunit, a first generating subunit, a first establishing subunit, a second sending subunit, a second receiving subunit, a third sending subunit, a third receiving subunit, a second generating subunit and a second establishing subunit; wherein the first determining subunit is located in the SBC and configured to determine whether the IMS terminal has the capability of receiving status subscription information through the IP channels according to the status subscribe request message received by the receiving unit from the IMS terminal, and to trigger the second determining subunit when the IMS terminal has the capability of receiving status subscription information through the IP channels;

the second determining subunit is located in the SBC and configured to determine an IP channel for the IMS terminal in the SBC;

the first sending subunit is located in the SBC and configured to send the status subscribe request message to the RLS through an IP channel interface facing the RLS;

the first receiving subunit is located in the SBC and configured to receive the acknowledgment message of the subscribe request message returned by the RLS;

the obtaining subunit is located in the SBC and configured to obtain an IP address of the RLS in the acknowledgment message after the first receiving subunit receives the acknowledgment message of the subscribe request message;

the first generating subunit is located in the SBC and configured to generate an IP forwarding strategy facing the RLS;

the first establishing subunit is located in the SBC and configured to establish the IP channel between the SBC and the RLS;

the second sending subunit is located in the SBC and configured to send the acknowledgment message of the subscribe request message to the IMS terminal;

the second receiving subunit is located in the IMS terminal and configured to receive the acknowledgment message of the subscribe message from the SBC;

the third sending subunit is located in the IMS terminal and configured to send an empty data packet to the SBC through an IP channel interface of the SBC facing the IMS terminal;

the third receiving subunit is located in the SBC and configured to receive the empty data packet;

the second generating subunit is configured to generate a forwarding strategy facing the IMS terminal; and the second establishing subunit is configured to establish the IP channel between the SBC and the IMS terminal.

10. The system according to claim 9, wherein the first sending subunit further comprises a parsing sub-module, a removing sub-module, a replacing sub-module and a sending sub-module; wherein the parsing sub-module is configured to parse the status subscribe request message received from the IMS terminal;

the removing sub-module is configured to remove the information about whether the IMS terminal has the capability of receiving status subscription information through the IP channels;

the replacing sub-module is configured to replace address information of the IMS terminal in the status subscribe request message with an address of the IP channel interface facing the RLS; and the sending sub-module is configured to send the status subscribe request message to the RLS through a P-CSCF and an S-CSCF.

11. The system according to claim 9, wherein the first generating subunit further obtains, through the obtaining unit, IP address information of the RLS contained in the acknowledgment message returned by the RLS, and uses the IP address of the RLS as a destination address of data packets sent to the RLS from the IMS terminal; and the second generating subunit further obtains IP address information of the IMS terminal according to the empty data packet, and uses the IP address of the IMS terminal as a destination address of data packets sent to the IMS terminal from the RLS.

* * * * *